(12) United States Patent
Seike et al.

(10) Patent No.: US 7,960,475 B2
(45) Date of Patent: Jun. 14, 2011

(54) POWDER COATING COMPOSITION

(75) Inventors: Naoyuki Seike, Osaka (JP); Koichi Yamaguchi, Osaka (JP); Yutaka Furuya, Wakayama (JP); Tetsuro Agawa, Osaka (JP)

(73) Assignee: DIC Corporation, Tokyo (JP)

( * ) Notice: Subject to any disclaimer, the term of this patent is extended or adjusted under 35 U.S.C. 154(b) by 985 days.

(21) Appl. No.: 10/592,115

(22) PCT Filed: Mar. 9, 2005

(86) PCT No.: PCT/JP2005/004070
§ 371 (c)(1),
(2), (4) Date: Sep. 8, 2006

(87) PCT Pub. No.: WO2005/087881
PCT Pub. Date: Sep. 22, 2005

(65) Prior Publication Data
US 2007/0240613 A1 Oct. 18, 2007

(30) Foreign Application Priority Data
Mar. 11, 2004 (JP) .............................. P2004-069045

(51) Int. Cl.
*C08F 8/00* (2006.01)
(52) U.S. Cl. ........ 525/100; 428/461; 428/515; 525/476; 525/934; 522/99; 526/279
(58) Field of Classification Search .................. 528/208; 428/461, 515
See application file for complete search history.

(56) References Cited

U.S. PATENT DOCUMENTS

| | | | |
|---|---|---|---|
| 5,948,866 A | 9/1999 | Takeda et al. | |
| 6,649,267 B2 * | 11/2003 | Agawa et al. | 428/413 |
| 6,657,001 B1 * | 12/2003 | Anderson et al. | 524/588 |
| 7,053,149 B2 * | 5/2006 | Anderson et al. | 524/588 |
| 2001/0021749 A1 * | 9/2001 | Yeats et al. | 525/100 |
| 2003/0026993 A1 | 2/2003 | Agawa et al. | 428/413 |

FOREIGN PATENT DOCUMENTS

| | | |
|---|---|---|
| DE | 43 41 235 A1 | 6/1995 |
| EP | 1 266 938 A2 | 12/2002 |
| JP | 09-227799 | 9/1997 |
| JP | 09-241538 | 9/1997 |
| JP | 09241538 * | 9/1997 |
| JP | 2002-371227 | 12/2002 |
| JP | 2003-292881 | 10/2003 |

OTHER PUBLICATIONS

Brandrup, J; Immergut, E.H.; Grulke, E.A., "Polymer Handbook", 1999, John Wiley, 4th Edition, VII (pp. 497-535).*
Supplemental European Search Report in Counterpart Application No. EP 05 72 0342, mailed Dec. 17, 2009.

* cited by examiner

*Primary Examiner* — Randy Gulakowski
*Assistant Examiner* — Lindsay Nelson
(74) *Attorney, Agent, or Firm* — Edwards Angell Palmer & Dodge LLP

(57) ABSTRACT

A powder coating composition of the present invention includes, as essential components, an epoxy group-containing vinyl copolymer (A) with a glass transition temperature of 40° C. or higher, an epoxy group-containing vinyl copolymer (B) that contains organosiloxane side chains and has a glass transition temperature of 0° C. or lower, and a polyvalent carboxylic acid (C), and is able to form a coating film with excellent external appearance and scratch resistance.

12 Claims, No Drawings

POWDER COATING COMPOSITION

BACKGROUND OF THE INVENTION

1. Field of the Invention

The present invention relates to a powder coating composition that is capable of forming a coating film with excellent external appearance and scratch resistance.

2. Description of Related Art

Powder coatings are widely used for the general coating of metals, as environmentally friendly coating materials that do not release organic solvents into the atmosphere during application. Of such coatings, powder coating compositions that include an epoxy group-containing vinyl copolymer as the primary component and use a polyvalent carboxylic acid as a curing agent component enable the formation of coating films with particularly superior levels of gloss, weather resistance, and chemical resistance, and are consequently particularly widely used.

In recent years, considerable research has been undertaken into powder coating compositions for future use as the top clear coatings for automobiles. If environmentally friendly powder coating compositions were able to be used to completely replace the conventional solvent-based coatings used within the enormous market of automobile top clear coatings, then the level of environmental impact would be able to be reduced dramatically. However, in the case of these automobile top clear coatings, the required performance in terms of the external appearance and scratch resistance of the coating film finish is very high, and satisfying these performance levels with conventional powder coating compositions has proven difficult, meaning solvent-based coating materials continue to be used.

In order to meet these needs, for example, a powder coating composition that includes, as the primary component, a silicone-acrylic copolymer in which an organopolysiloxane and an acrylic copolymer are bonded together to form a graft or block copolymer has been reported as exhibiting excellent leveling properties upon melting and excellent scratch resistance (for example, see patent reference 1). However, because this technique employs a large quantity of an organopolysiloxane, problems such as a deterioration in the sharpness of the coating film, and an increase in the likelihood of cissing arise, and the scratch resistance is also unable to satisfy the high levels of performance that are now being demanded, meaning there is still considerable room for improvement.

Furthermore, methods in which two epoxy group-containing acrylic resins are blended together to yield coating films that combine favorable smoothness with favorable scratch resistance have also been proposed (for example, see patent reference 2 and patent reference 3). Because use of these powder coating compositions enables the formation of superior coating films that satisfy the requirements for excellent external appearance and scratch resistance, the use of such compositions within applications such as the formation of automobile top clear coatings, which have conventionally avoided the use of powder coating compositions due to problems associated with the external appearance and scratch resistance performance of the produced coating films, has now become possible, and these powder coating compositions are now starting to be used as replacements for conventional solvent-based coating materials in some areas.

However, with recent moves to more up-market automobile coatings, demands continue to grow for even more improvement in the external appearance of coating film finishes. In addition, demands for higher levels of scratch resistance, which will either prevent or not show scratching when the vehicle is subjected to washing in a car-wash machine, are also growing.

Moreover, from the viewpoints of reducing the quantity used of powder coating compositions, reducing the level of energy consumption, and reducing the overall costs associated with the coating process, demands for reducing the thickness of formed coating films are also considerable. In other words, a composition is required that enables a reduction in the film thickness from the thick films employed with conventional powder coating compositions, and yet also exhibits superior external appearance for the coating film finish and a high level of scratch resistance.

Under these circumstances, even the powder coating compositions described above require further improvement in the level of scratch resistance.

[Patent Reference 1]
Japanese Unexamined Patent Application, First Publication No. Hei 09-241538

[Patent Reference 2]
Japanese Unexamined Patent Application, First Publication No. Hei 09-227799

[Patent Reference 3]
Japanese Unexamined Patent Application, First Publication No. 2003-292881

SUMMARY OF THE INVENTION

An object of the present invention is to provide a powder coating composition which, in all manner of applications, exhibits superior external appearance of the coating film finish, and excellent scratch resistance, even when the film thickness of the coating film is reduced to a value less than the film thickness of conventionally formed coating films.

In order to achieve the object outlined above, the inventors of the present invention focused on the superior external appearance of the coating film finish and the excellent level of scratch resistance exhibited by a powder coating composition that includes a conventional mixture of two different epoxy group-containing vinyl copolymers, one being an epoxy group-containing vinyl copolymer with a glass transition temperature of 40° C. or higher and the other being an epoxy group-containing vinyl copolymer with a glass transition temperature of 0° C. or lower, together with a polyvalent carboxylic acid, and then conducted their research with the aim of further improving the performance of this type of composition.

When the inventors investigated the effects of using an organosiloxane to modify the epoxy group-containing vinyl copolymer with a glass transition temperature of 40° C. or higher, which represents the primary component of the above powder coating composition, they confirmed that provided the quantity used of the organosiloxane was increased above a certain quantity, improvements could be achieved in the external appearance of the coating film finish and the scratch resistance. However, if the quantity of the organosiloxane was increased to the level required to realize these effects, then various problems arose, including a deterioration in storage stability, a deterioration in the sharpness of the coating film, and an increase in the likelihood of cissing occurring in the coating film, whereas if the quantity of the organosiloxane was restricted in order to avoid these problems, then the improvements in the external appearance of the coating film finish and the scratch resistance would not manifest adequately, meaning a composition that is suitable for practical application was unobtainable.

Furthermore, in general, if a residual quantity of an organosiloxane component is left within an apparatus used for the production or application of a coating material, then this residual organosiloxane becomes incorporated within other coating materials and resins, and can cause a deterioration in the external appearance of the resulting coating film (such as the generation of cissing), and consequently the quantity of organosiloxane used is preferably kept as small as possible.

Upon further investigation, the inventors discovered that if organosiloxane side chains were introduced into the epoxy group-containing vinyl copolymer with a glass transition temperature of 0° C. or lower that constitutes part of the powder coating, composition, then even if the quantity of organosiloxane, used was comparatively small, the scratch resistance improved particularly dramatically, while the storage stability and the sharpness of the coating film remained favorable, and the coating film did not develop problems such as cissing.

It is thought that an epoxy group-containing vinyl copolymer that contains organosiloxane side chains and has a glass transition temperature of 0° C. or lower tends to become concentrated near the surface of the coating film when the powder coating composition is applied and then subjected to baking and curing to form the coating film, and that consequently, even if the quantity used of the organosiloxane is comparatively low, the external appearance of the coating film finish and the scratch resistance are able to be effectively improved.

In recent years there has been a considerable increase in the opportunities available for washing vehicles in car-wash machines, and in such cases it is desirable that the coating film is not scratched, but the formation of very fine scratches within the coating film is almost unavoidable. When scratches are formed in the coating film, either in the type of situation described above or for other reasons, if the coating film is subsequently left exposed to the environment for an extended period, increases in the air temperature can cause an increase in the temperature of the vehicle body, thereby causing a partial softening of the coating film, which can allow the previously formed scratches to heal. In the following description, this ability of scratches that have been formed in the coating film to undergo healing as a result of temperature increases that occur when the coating film is left exposed to the environment is termed "scratch self-recovery", and the associated property is referred to as a "scratch self-recovery property".

From the viewpoint of the external appearance of the coating film, this "scratch self-recovery property" is an extremely useful property for the coating film to possess, and has recently been attracting considerable attention within some areas of the automobile coating industry, to the extent that coating materials for which the coating film exhibits this "scratch self-recovery property" are now keenly sought.

The inventors discovered that a coating film formed using an aforementioned powder coating composition that includes a mixture of two different epoxy group-containing vinyl copolymers, one being an epoxy group-containing vinyl copolymer with a glass transition temperature of 40° C. or higher, and the other being an epoxy group-containing vinyl copolymer that contains organosiloxane side chains and has a glass transition temperature of 0° C. or lower, together with a polyvalent carboxylic acid, exhibits an aforementioned "scratch self-recovery property" that is vastly superior to conventional powder coating compositions.

The present invention provides a powder coating composition that includes, as essential components, an epoxy group-containing vinyl copolymer (A) with a glass transition temperature of 40° C. or higher, an epoxy group-containing vinyl copolymer (B) that contains organosiloxane side chains and has a glass transition temperature of 0° C. or lower, and a polyvalent carboxylic acid (C).

According to a powder coating composition of the present invention, a coating film that exhibits a superior external appearance of the coating film finish, excellent scratch resistance, and an excellent scratch self-recovery property can be obtained, even in those cases where the coating film is formed with a film thickness that is less than that of conventional coating films. A powder coating composition of the present invention is useful for environmentally friendly automobile coating materials, and particularly for top coat coating materials.

BEST MODE FOR CARRYING OUT THE INVENTION

As follows is a more detailed description of embodiments of the present invention.

First is a description of an epoxy group-containing vinyl copolymer (A) with a glass transition temperature of 40° C. or higher, which represents one of the essential components of a powder coating composition of the present invention.

The epoxy group-containing vinyl copolymer (A) is a vinyl copolymer that contains at least one, and preferably an average of two or more, epoxy groups within each molecule, and also has a glass transition temperature of 40° C. or higher.

This epoxy group-containing vinyl copolymer (A) can be produced, for example, using an epoxy group-containing vinyl monomer, and where necessary one or more other vinyl monomers that are copolymerizable with the epoxy group-containing vinyl monomer, by conducting a polymerization of the monomers within an organic solvent.

Examples of epoxy group-containing vinyl monomers that can be used in the production of the above epoxy group-containing vinyl copolymer (A) include, for example, various epoxy group-containing monomers such as glycidyl(meth)acrylate, β-methylglycidyl(meth)acrylate, glycidyl vinyl ether and allyl glycidyl ether, vinyl monomers containing a (2-oxo-1,3-oxolane) group such as (2-oxo-1,3-oxolane)methyl (meth)acrylate, and alicyclic epoxy group-containing vinyl monomers such as 3,4-epoxycyclohexyl(meth)acrylate, 3,4-epoxycyclohexylmethyl(meth)acrylate and 3,4-epoxycyclohexylethyl(meth)acrylate.

Examples of other vinyl monomers that are copolymerizable with the above epoxy group-containing vinyl monomers include various conventional vinyl monomers such as (meth)acrylic acid, crotonic acid, and esters of these acids.

Examples of compounds that can be used as esters of (meth)acrylic acid include alkyl(meth)acrylates such as methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-hexyl (meth)acrylate, cyclohexyl(meth)acrylate, 2-ethylhexyl (meth)acrylate, n-octyl(meth)acrylate, isooctyl(meth)acrylate, 2-ethyloctyl (meth)acrylate, dodecyl(meth)acrylate, isodecyl(meth)acrylate, lauryl(meth)acrylate, and stearyl (meth)acrylate, benzyl(meth)acrylate, phenyl(meth)acrylate, phenoxyethyl(meth)acrylate, tetrahydrofuryl(meth)acrylate, isobornyl (meth)acrylate, dicyclopentanyl (meth)acrylate, dicyclopentenyl(meth)acrylate, dicyclopentenyloxyethyl(meth) acrylate, and alkylcarbitol(meth)acrylates such as ethylcarbitol (meth)acrylate, hydroxyl group-containing (meth)acrylates such as 2-hydroxyethyl(meth)acrylate, 2-hydroxypropyl(meth)acrylate, 3-hydroxypropyl(meth)acrylate and 4-hydroxybutyl (meth) acrylate, hydroxyl group-containing (meth)acrylates in which the above hydroxyl group-containing (meth)acrylates have undergone a ring-opening reaction with ε-caprolactone, polyethylene glycol mono(meth)acrylate, and polypropylene glycol mono(meth)acrylate.

In addition, examples of other suitable vinyl monomers include various hydrolyzable silyl group-containing monomers such as γ-(meth)acryloyloxypropyltrimethoxysilane, γ-(meth)acryloyloxypropyltriethoxysilane, and γ-(meth) acryloyloxypropylmethyldimethoxysilane, organosiloxanes containing one radical polymerizable group such as a vinyl group, acrylic group, methacrylic group, or allyl group within each molecule, vinyl fluoride, vinylidene fluoride, trifluoroethylene, tetrafluoroethylene, chlorotrifluoroethylene, bromotrifluoroethylene, pentafluoropropylene, hexafluoropropylene, other fluorine-containing vinyl monomers including fluoroalkyl fluorovinyl ethers and fluoroalkyl vinyl ethers (in which the number of carbon atoms of the alkyl group is within a range from 1 to 18) such as trifluoromethyl trifluorovinyl ether, pentafluoroethyl trifluorovinyl ether, and heptafluoropropyl trifluorovinyl ether, various halogen-containing vinyl monomers besides the fluorine-containing vinyl monomers listed above, such as vinyl chloride and vinylidene chloride, α-olefins such as ethylene, propylene and butene-1, acidic phosphoric acid (meth)acrylate esters such as mono [(meth)acryloyloxyethyl]phosphoric acid, (meth)acrylate phosphate esters such as diphenyl-2-(meth)acryloyloxyethyl phosphate, monoesters or diesters of a monomer containing polycarboxyl groups such as fumaric acid, maleic acid or itaconic acid, and a monoalkyl alcohol of 1 to 18 carbon atoms, aromatic vinyl compounds such as styrene, vinyltoluene, α-methylstyrene and p-tert-butylstyrene, amide-based vinyl monomers such as (meth)acrylamide, N-methyl (meth)acrylamide, N-ethyl(meth)acrylamide, N-n-propyl(meth)acrylamide, N-iso-propyl (meth)acrylamide, N-n-butyl(meth)acrylamide, N-iso-butyl(meth)acrylamide, N-tert-butyl(meth)acrylamide, N-amyl(meth)acrylamide, N-(meth)acrylamide, N-hexyl (meth)acrylamide, N-heptyl (meth)acrylamide, N-2-ethylhexyl(meth)acrylamide, N,N-dimethyl(meth)acrylamide, N,N-diethyl(meth)acrylamide, N-methylol (meth)acrylamide, N-methoxymethyl(meth) acrylamide, N-ethoxymethyl (meth)acrylamide, N-n-propoxymethyl(meth)acrylamide, N-iso-propoxymethyl (meth) acrylamide, N-n-butoxymethyl(meth)acrylamide, N-iso-butoxymethyl (meth)acrylamide, N-tert-butoxymethyl (meth)acrylamide, N-amyloxymethylacrylamide, N-hexyloxy(meth)acrylamide, N-heptyloxymethyl(meth) acrylamide, N-octyloxymethyl (meth)acrylamide, N-2-ethyl-hexyloxymethyl(meth)acrylamide, and diacetone (meth)acrylamide, various dialkylaminoalkyl(meth)acrylates such as dimethylaminoethyl (meth)acrylate and diethylaminoethyl (meth)acrylate, nitrogen-containing vinyl monomers such as tert-butylaminoethyl(meth)acrylate, tert-butylaminopropyl(meth) acrylate, aziridinylethyl(meth)acrylate, pyrrolidinylethyl (meth)acrylate, piperidinylethyl(meth)acrylate, (meth)acryloylmorpholine, N-vinyl-2-pyrrolidone, N-vinylcaprolactam, N-vinyloxazoline, and (meth)acrylonitrile, aliphatic vinyl carboxylates such as vinyl acetate, vinyl propionate, vinyl butyrate, vinyl isobutyrate, vinyl caproate, vinyl caprylate, vinyl caprate, vinyl laurate, branched aliphatic vinyl carboxylates of 9 to 11 carbon atoms, and vinyl stearate, vinyl esters of carboxylic acids that have a cyclic structure, such as vinyl cyclohexanecarboxylate, vinyl methylcyclohexanecarboxylate, vinyl benzoate, and vinyl p-tert-butylbenzoate, and alkyl vinyl ethers such as ethyl vinyl ether, hydroxyethyl vinyl ether, hydroxy-n-butyl vinyl ether, hydroxyisobutyl vinyl ether, cyclohexyl vinyl ether, and lauryl vinyl ether.

During production of the epoxy group-containing vinyl copolymer (A), any of the various conventional radical polymerization initiators can be used.

Examples of such radical polymerization initiators include azo compounds such as 2,2'-azobisisobutylonitrile, 2,2'-azobis-methylbutylonitrile, 2,2'-azobis-2,4-dimethylvaleronitrile, 1,1'-azobis-cyclohexanecarbonitrile, dimethyl-2,2'-azobisisobutyrate, 4,4'-azobis-4-cyanovaleric acid, 2,2'-azobis-(2-amidinopropene) dihydrochloride, 2-tert-butylazo-2-cyanopropane, 2,2'-azobis(2-methylpropionamide) dihydrate, 2,2'-azobis[2-(2-imidazolin-2-yl) propene], and 2,2'-azobis(2,2,4-trimethylpentane);

ketone peroxides, peroxyketals, hydroperoxides, dialkyl peroxides, diacyl peroxides, peroxyesters and peroxydicarbonates, such as benzoyl peroxide, methyl ethyl ketone peroxide, cumene hydroperoxide, potassium persulfate, tert-butyl peroxyneodecanoate, tert-butyl peroxypivalate, tert-butyl peroxy-2-ethylhexanoate, tert-butyl peroxyisobutyrate, 1,1-bis-tert-butylperoxy-3,3,5-trimethylcyclohexane, tert-butyl peroxylaurate, tert-butyl peroxyisophthalate, tert-butyl peroxyacetate, tert-butyl peroxybenzoate, dicumyl peroxide and di-tert-butyl peroxide, as well as hydrogen peroxide.

In the production of the epoxy group-containing vinyl copolymer (A) by polymerization of the above monomers in an organic solvent, any conventional organic solvent can be used.

Examples of suitable solvents include alkyl alcohols such as methanol, ethanol, n-propanol, isopropanol, n-butanol, isobutanol, sec-butanol, tert-butanol n-pentanol, and isopentanol;

glycol ethers such as methyl cellosolve, ethyl cellosolve, ethylene glycol dimethyl ether, ethylene glycol diethyl ether, propylene glycol monomethyl ether, propylene glycol monoethyl ether, propylene glycol monopropyl ether, propylene glycol dimethyl ether, and propylene glycol diethyl ether;

Aromatic hydrocarbons such as benzene, toluene, xylene, and ethylbenzene; mixed hydrocarbons that contain an aromatic hydrocarbon, such as EXXON AROMATIC NAPHTHA NO. 2 (manufactured by Exxon Corporation, USA); aliphatic hydrocarbons such as n-pentane, n-hexane, and n-octane; mixed hydrocarbons that contain an aliphatic hydrocarbon, such as ISOPAR C, ISOPAR E, EXXSOL DSP 100/140, EXXSOL D30 (all manufactured by Exxon Corporation, USA), IP Solvent 1016 (manufactured by Idemitsu Petrochemical Co., Ltd.); alicyclic hydrocarbons such as cyclopentane, cyclohexane, methylcyclohexane, and ethylcyclohexane;

ethers such as tetrahydrofuran, dioxane, diisopropyl ether, and di-n-butyl ether; ketones such as acetone, methyl ethyl ketone, and methyl isobutyl ketone; and esters such as methyl acetate, ethyl acetate, n-propyl acetate, isopropyl acetate, n-butyl acetate, isobutyl acetate, n-amyl acetate, isoamyl acetate, hexyl acetate, ethyl propionate, and butyl propionate.

Furthermore, if necessary, a chain transfer agent can also be used, suitable examples of which include dodecyl mercaptan, lauryl mercaptan, thioglycolate esters, mercaptoethanol, and α-methylstyrene dimer.

There are no particular restrictions on the number average molecular weight of the epoxy group-containing vinyl copolymer (A) with a glass transition temperature of 40° C. or higher that is used in the present invention, although from the viewpoint of ensuring excellent smoothness of the coating film when the film thickness is reduced, the number average molecular weight is preferably within a range from 1,000 to 8,000, even more preferably from 1,000 to 5,000, and most preferably from 1,500 to 2,500.

Furthermore, the epoxy equivalence within this epoxy group-containing vinyl copolymer (A) is preferably within a range from 200 to 800, even more preferably from 250 to 450, and most preferably from 300 to 400.

Next is a description of an epoxy group-containing vinyl copolymer (B) used in the present invention, which has a glass transition temperature of 0° C. or lower and contains organosiloxane side chains.

This epoxy group-containing vinyl copolymer (B) refers to a vinyl copolymer with a glass transition temperature of 0° C. or lower, which contains at least one, and preferably two or more, epoxy groups within each molecule, and in which an organosiloxane and the vinyl copolymer are bonded together in a graft-like arrangement.

Provided the epoxy group-containing vinyl copolymer (B) has the type of structure described above, there are no particular restrictions on the method used for producing the copolymer. For example, the copolymer can be produced by a variety of methods, including (1) conducting a copolymerization using an epoxy group-containing vinyl monomer, an organosiloxane that contains one radical polymerizable group within each molecule, and other vinyl monomers, (2) adding an organosiloxane that contains one reactive group such as a hydroxyl group, amino group or carboxyl group within each molecule to an epoxy group-containing copolymer, and (3) conducting a copolymerization of an epoxy group-containing vinyl monomer and other vinyl monomers in the presence of an organosiloxane that contains one mercapto group within each molecule.

However, considering the ease of polymer preparation, a method that uses an epoxy group-containing vinyl monomer and an organosiloxane that contains one radical polymerizable group within each molecule as essential components, together with other vinyl monomers as required, wherein these monomers are subjected to polymerization in an organic solvent, is particularly desirable.

In this polymerization, the epoxy group-containing vinyl monomer and the other vinyl monomers can employ any of the vinyl monomers exemplified above as suitable monomers for use within the production of the aforementioned epoxy group-containing vinyl copolymer (A) with a glass transition temperature of 40° C. or higher.

There are no particular restrictions on the organosiloxane that contains one radical polymerizable group within each molecule, which may be any organosiloxane that contains one radical polymerizable group such as an acryloyl group, methacryloyl group, vinyl group or allyl group within each molecule, although from the viewpoints of ease of polymerization of the epoxy group-containing vinyl copolymer (B), and storage stability of the powder coating material of the present invention, an organosiloxane that contains an acryloyl group or methacryloyl group at one terminal of the molecule, as represented by a general formula [I] shown below, is preferred.

[Formula 1]

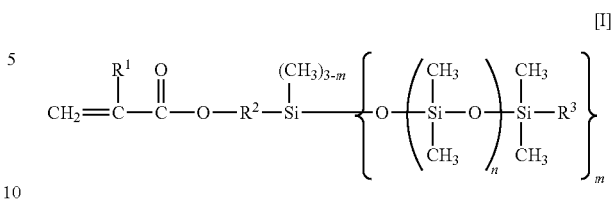

(wherein, $R^1$ represents a hydrogen atom or a methyl group, $R^2$ represents a bivalent hydrocarbon group of 1 to 12 carbon atoms, or a bivalent hydrocarbon group that includes an ether linkage and/or ester linkage, $R^3$ represents a monovalent hydrocarbon group of 1 to 8 carbon atoms, m represents an integer from 1 to 3, and n represents an integer from 0 to 250)

Furthermore, in consideration of factors such as copolymerizability and compatibility with the aforementioned other vinyl monomers, as well as properties such as the external appearance, scratch resistance and water resistance of products coated with the obtained coating material, the value of n in the general formula [I] is preferably no higher than 150, and is even more preferably 50 or lower.

The organosiloxane represented by the above general formula [I] can use commercially available products, examples of which include the products SILAPLANE FM-0711, FM-0721, FM-0725, TM-0701, and TM-0701T (manufactured by Chisso Corporation); the products X-22-2404, X-24-8201, X-22-174DX, and X-22-2426 (manufactured by Shin-Etsu Chemical Co., Ltd.); the product BX-16-122A (manufactured by Dow Corning Toray Silicone Co., Ltd.); and the product TSL9705 (manufactured by Toshiba Silicone Co., Ltd.)

The quantity of the organosiloxane side-chains contained within the epoxy group-containing vinyl copolymer (B) is preferably within a range from 0.01 to 5% by weight, and most preferably within a range from 0.05 to 2% by weight, relative to the combined weight of the epoxy group-containing vinyl copolymer (A) and the epoxy group-containing vinyl copolymer (B) that constitute the powder coating composition of the present invention. Provided the organosiloxane quantity falls within this range, the storage stability of the powder coating composition of the present invention is favorable, and the obtained coating film is formed with no cissing and with a favorable level of scratch resistance.

Furthermore, from the viewpoint of ensuring favorable stability over time in the excellent levels of humidity resistance, water resistance and scratch resistance exhibited by the coating film obtained using the powder coating composition of the present invention, the epoxy group-containing vinyl copolymer (B) preferably contains structural units derived from an alkyl methacrylate (b-1) containing an alkyl group of 8 or more carbon atoms as a raw material. The quantity of these structural units derived from the alkyl methacrylate (b-1) containing an alkyl group of 8 or more carbon atoms is preferably within a range from 30 to 80% by weight, and even more preferably from 40 to 60% by weight.

Suitable examples of the alkyl methacrylate (b-1) containing an alkyl group of 8 or more carbon atoms include 2-ethylhexyl methacrylate, n-octyl methacrylate, isooctyl methacrylate, 2-ethyloctyl methacrylate, n-decyl methacrylate, isodecyl methacrylate, lauryl methacrylate, stearyl methacrylate, eicosyl methacrylate, and tetracicosyl methacrylate.

These alkyl methacrylates (b-1) containing an alkyl group of 8 or more carbon atoms may either be used either alone, or in combinations of two or more different compounds. Of these esters, those containing an alkyl group of 12 or more carbon atoms, such as lauryl methacrylate and stearyl methacrylate, are particularly desirable.

Furthermore, examples of radical polymerization initiators, organic solvents, and chain transfer agents that can be used in the production of this epoxy group-containing vinyl copolymer (B) include the same materials as those exemplified for the production of the epoxy group-containing vinyl copolymer (A).

Furthermore, from the viewpoint of ensuring favorable stability over time in the excellent levels of humidity resistance, water resistance and scratch resistance exhibited by the coating film obtained using the powder coating composition of the present invention, the epoxy equivalence of the epoxy group-containing vinyl copolymer (B) is preferably no higher than 1,500, and is even more preferably 800 or lower.

Furthermore, for the same reasons, the number average molecular weight of the epoxy group-containing vinyl copolymer (B) is preferably within a range from 2,500 to 20,000, and even more preferably within a range from 5,000 to 15,000.

From the viewpoint of ensuring excellent storage stability for the powder coating composition of the present invention, the quantity used of the epoxy group-containing vinyl copolymer (B) is preferably within a range from 0.1 to 10% by weight, even more preferably from 0.5 to 5% by weight, and most preferably from 1 to 4% by weight relative to the epoxy group-containing vinyl copolymer (A).

In terms of ensuring superior levels of smoothness and scratch resistance for the resulting coating film, the epoxy group-containing vinyl copolymer (A) and the epoxy group-containing vinyl copolymer (B) that constitute the powder coating composition of the present invention are preferably essentially incompatible.

In this description, the expression "essentially incompatible" refers to the case where, upon mixing of the epoxy group-containing vinyl copolymer (A) and the epoxy group-containing vinyl copolymer (B) in a ratio within the range described above, conducting subsequent heating to melt the two copolymers, and then cooling the mixture to form a coating film, turbidity can be detected in the coating film. In order to ensure that the epoxy group-containing vinyl copolymer (A) and the epoxy group-containing vinyl copolymer (B) are essentially incompatible, the difference between the SP value of the epoxy group-containing vinyl copolymer (A) and the SP value of the epoxy group-containing vinyl copolymer (B) preferably falls within a range from 1.0 to 4.0, and moreover, the epoxy group-containing vinyl copolymer (B) preferably has an SP value that is lower than that of the epoxy group-containing vinyl copolymer (A).

By ensuring that the difference between the SP values of the two components falls within the above range, the epoxy group-containing vinyl copolymer (B) is concentrated near the surface of the coating film, so that even if the film thickness of the coating film is reduced, the external appearance of the coating film finish and the scratch resistance, weather resistance, water resistance and humidity resistance of the coating film are still able to be improved.

The SP value mentioned above is a parameter that indicates the polarity of a resin, and is determined using the method described below.

0.5 g of a sample resin is weighed into a 100 ml Erlenmeyer flask, and 10 ml of tetrahydrofuran (THF) is then added to dissolve the resin. With the resulting solution held at a liquid temperature of 25° C., hexane is added dropwise from a 50 ml burette while the solution is stirred with a magnetic stirrer, and the volume of hexane added ($v_h$) at the point where turbidity develops within the solution (the turbidity point) is determined.

Subsequently, using deionized water instead of hexane, the volume of deionized water that must be added ($v_d$) to reach the turbidity point is also determined.

Using the values of $v_h$ and $v_d$, the SP value δ of the resin can be determined in the manner shown below, using the equation disclosed by Suh and Clarke [J. Polym. Sci. A-1, Vol. 5, 1671 to 1681 (1967)].

$$\delta = [(V_{mh})^{(1/2)} \cdot \delta_{mh} + (V_{md})^{(1/2)} \cdot \delta_{md}] / [(V_{mh})^{(1/2)} + (V_{md})^{(1/2)}]$$

wherein, $V_{mh} = (V_h \cdot V_t)/(\phi_h \cdot V_t + \phi_{ht} \cdot V_h)$,
$V_{md} = (V_d \cdot V_t)/(\phi_d \cdot V_t + \phi_{dt} \cdot V_d)$,
$\delta_{mh} = \phi_h \cdot \delta_h + \phi_{ht} \cdot \delta_t$,
$\delta_{md} = \phi_d \cdot \delta_d + \phi_{dt} \cdot \delta_t$, $\phi_h$, $\phi_{ht}$; volume fraction of hexane and THF at the turbidity point when using hexane as a titration solvent, $\phi_d$, $\phi_{dt}$; volume fraction of deionized water and THF at the turbidity point when using deionized water as a titration solvent, $[\phi_h = v_h/(v_h+10)$, $\phi_{ht} = 10/(v_h+10)$, $\phi_d = v_d/(v_d+10))$, $\phi_{dt} = 10/(v_d+10)]$, wherein 10 is a volume (ml) using THF, $\delta_h$, $\delta_d$, $\delta_t$; SP value of hexane, deionized water and THF respectively, and $V_h$, $V_d$, $V_t$; molecular volume of hexane, deionized water and THF (ml/mol) respectively.

Next is a description of the polyvalent carboxylic acid (C) used in the present invention.

Aliphatic or aromatic polyvalent carboxylic acids are mainly used as the polyvalent carboxylic acid (C). Typical examples include succinic acid, glutaric acid, adipic acid, pimelic acid, suberic acid, azelaic acid, sebacic acid, brasylic acid, dodecanoic diacid, eicosanoic diacid, tetraeicosanoic diacid, maleic acid, citraconic acid, itaconic acid, and glutaconic acid;

phthalic acid, isophthalic acid, trimellitic acid, pyromellitic acid, tetrahydrophthalic acid, hexahydrophthalic acid, cyclohexene-1,2-dicarboxylic acid, and acid anhydrides thereof. These polyvalent carboxylic acids (C) may be used either alone, or in combinations of two or more different compounds.

Of these, aliphatic dibasic acids are preferred as they provide superior coating film properties and storage stability, and dodecanoic diacid is particularly preferred as it yields excellent coating film properties.

The blend ratio between the epoxy group-containing vinyl copolymers (A) and (B) used in the present invention, and the polyvalent carboxylic acid (C) is preferably set so that the equivalence ratio between the epoxy groups within the copolymers (A) and (B), and the carboxyl groups within the polyvalent carboxylic acid (C) [(epoxy groups within the copolymers (A) and (B))/(carboxyl groups within the polyvalent carboxylic acid (C))] falls within a range from 0.5 to 1.5, and even more preferably within a range from 0.8 to 1.2.

A variety of synthetic resins such as epoxy resins, polyester resins, urethane resins or polyamide resins as well as various conventional coating material additives or pigments or the like such as curing catalysts, flow modifiers, anti-blocking agents, ultraviolet absorbers, photostabilizers, benzoin, antistatic agents and antioxidants may also be added to the powder coating composition of the present invention if required.

Of the above additives, suitable ultraviolet absorbers include benzophenone-based compounds, benzotriazole-based compounds, salicylate-based compounds, and nickel complexes, suitable photostabilizers include various hindered amine-based compounds, and suitable antioxidants include phenol-based compounds, phosphite-based compounds, and thioether-based compounds.

As the curing catalyst, phosphines such as triphenylphosphine, imidazoles such as 2-methylimidazole, and ammonium salts such as tetrabutylammonium chloride can be used.

Furthermore, suitable pigments that can be used include various inorganic pigments such as titanium oxide, red iron oxide, chrome titanium yellow, yellow iron oxide, and carbon black, various conventional organic pigments and extenders, including phthalocyanine-based pigments such as phthalocyanine blue and phthalocyanine green, anthraquinone-based pigments such as indanthrene blue and dianthraquinonyl red, quinacridone-based pigments, azo-based pigments such as lake red, fast yellow, disazo yellow and permanent red, nitro-based pigments such as naphthol yellow, and nitroso-based pigments such as pigment green B and naphthol green, and various conventional brilliant (metallic) pigments such as aluminum flakes and mica flakes.

From the viewpoints of achieving favorable quality, stability and stable mass production, the powder coating composition of the present invention is ideally prepared using a so-called melt-kneading method. In other words, the target powder coating composition can be obtained by mixing together each of the aforementioned raw materials, conducting thorough melt-kneading of the mixture using a melt kneading device such as a heat roller or extruder at a temperature within a range from 50 to 130° C., and then performing cooling, grinding, and classification.

Next is a description of a method of forming a coating film using the powder coating composition of the present invention.

The powder coating composition of the present invention can be used for coating various base materials, using conventional methods such as electrostatic spraying or fluidized dipping, and by baking the resulting coated article at a temperature of 120 to 250° C., a coating film of the powder coating composition can be obtained.

When a single layer or multilayer coating film is formed on an article to be coated, the powder coating composition of the present invention is preferably used as the coating material for the top coat. In particular, in those cases where a base coat coating material [i] is first applied to the article to be coated, and a top coat coating material [ii] is then applied on top of this base coat, the powder coating composition of the present invention is ideal as the top coat coating material [ii]. Furthermore, in those cases where the base coat coating material [i] is a colored base coat coating material, the top coat coating material [ii] is preferably a transparent top coat coating material.

The base coat coating material [i] refers to a coating material that is applied either directly to any of the various base materials described below, or to the surface of a coating film formed from an undercoat coating material or intermediate coating material that has been provided on the surface of the base material, and performs the functions of imparting a desired hue or design characteristics such as an attractive appearance to the base material, as well as ensuring favorable adhesion between the top coat coating material [ii] that is subsequently applied and the substrate.

Furthermore, the top coat coating material [ii] refers to a coating material that is applied to a coating film formed from the above base coat coating material [i], and performs the functions of protecting the coating film of the base coat coating material [i], and imparting gloss and the like.

Furthermore, the article to be coated refers to the base material to which the coating material is applied, and examples include uncoated metallic materials such as uncoated steel sheets, or untreated or chemically treated aluminum base materials, and specific examples include the base materials used in road vehicles such as automobile bodies or two-wheeled vehicle bodies, and the base materials used in automobile components such as aluminum wheels. Additional examples include the base materials used in road vehicles such as automobile bodies that have undergone electrodeposition coating. Furthermore, other potential examples include the base materials used in home appliances, automatic vending machines and steel furniture, such as electrogalvanized steel sheet, hot-dip galvanized steel sheet, tiles, different types of glass, various inorganic construction materials, various construction materials such as gates or fences, and various interior and exterior building materials such as aluminum sashes.

These base materials may either have undergone processing to generate a form suitable for the intended application, or may be in a form suitable for a PCM (precoat metal) coating method, that is, a cut flat sheet base material which is folded into a predetermined form corresponding with the intended application once a multilayer coating film has been formed using the method of the present invention. Base materials used in a coating system that is subjected entirely to post-forming, such as coil coating, are also suitable.

Furthermore, if necessary, base materials on which a coating film of an intermediate coating material have been formed can also be used favorably as the article to be coated.

This intermediate coating material refers to a coating material that is applied to the base material in order to improve the smoothness, chipping resistance, and interlayer adhesion and the like of the final multilayer coating film. The intermediate coating material includes any of a variety of principal components such as an alkyd resin, polyester resin, acrylic resin, epoxy resin or cellulose resin, together with a curing agent component such as an amino resin or polyisocyanate compound, and suitable intermediate coating materials include organic solvent-based materials, non-water-dispersible materials, powder materials, water-soluble materials or water-dispersible materials, which may cure either under heating or at room temperature.

A conventional water-based coating material or solvent-based coating material can be used as the aforementioned base coat coating material [i]. Examples of water-based coating materials that can be used as the base coat coating material include (1) coating materials containing a water-soluble resin as a binder, (2) coating materials containing a dispersion-type (water-dispersible) resin as a binder, and (3) coating materials containing an emulsion polymer as a binder.

Examples of coating materials of the above type (1) include coating materials containing, as a binder, a totally water-soluble resin prepared by conducting an amine neutralization of an acid group-containing acrylic resin obtained by copolymerizing a vinyl monomer that contains a carboxyl group. Examples of coating materials of the above type (2) include coating materials containing, as a binder, a water-dispersible polyurethane resin that contains an anion-forming group. Examples of coating materials of the above type (3) include coating materials formed from an aqueous solution of an emulsion polymer containing fine particles of a cross-linked polymer.

Examples of solvent-based coating materials that can be used as the base coat coating material include coating compositions containing a combination of an organic solvent solution of a polymer that is soluble in an organic solvent such as toluene or xylene, such as a vinyl resin that contains hydroxyl groups, and an aminoplast, polyisocyanate or block polyisocyanate or the like that undergoes reaction with the hydroxyl groups in the vinyl copolymer.

Of these coating materials, water-based and solvent-based coating materials containing a combination of a vinyl copolymer that contains hydroxyl groups, and an aminoplast, polyisocyanate, or block polyisocyanate that undergoes reaction with the hydroxyl groups in the vinyl copolymer are preferred, and of these, coating materials containing a combination of a vinyl copolymer that contains hydroxyl groups and an aminoplast are particularly preferred as they provide an excellent level of improvement in the adhesion to the article being coated.

These base coat coating materials [i] may contain various conventional pigments, including organic pigments, inorganic pigments, extenders, and brilliant (metallic) pigments, as well as other additives such as curing accelerators and leveling agents.

The powder coating composition of the present invention is ideal as the top coat coating material [ii] that is applied to a coating film formed from the above base coat coating material [i]. By using the powder coating composition of the present invention, a coating film can be obtained that exhibits superior levels of smoothness, scratch resistance, water resistance and humidity resistance, as well as excellent sharpness.

Although a non-transparent material may also be used as the top coat coating material [ii] in the present invention, in those cases where the base coat coating material [i] is a colored base coat coating material, the use of a transparent top coat coating material is preferred as it does not impair the attractive appearance of the lower coating film. The transparent top coat coating material may be colored with a pigment provided it remains transparent.

As described above, by applying the powder coating composition of the present invention to any of a variety of articles to be coated using normal methods, and subsequently conducting baking and drying, a coating film can be obtained that not only exhibits the types of properties that have conventionally been demanded, such as a superior external appearance for the coating film finish (smoothness) and a high level of scratch resistance, but also provides excellent sharpness.

EXAMPLES

As follows is a more detailed description of the present invention based on a series of reference examples, examples, and comparative examples. In the following description, unless stated otherwise, the units "parts" refer to "parts by weight".

Reference Example 1

Preparation of an Epoxy Group-Containing Vinyl-Based Copolymer (A-1)

A reaction vessel fitted with a thermometer, a stirrer, a reflux condenser, and a nitrogen inlet was charged with 100 parts of xylene, and the temperature was raised to 130° C.

A mixture containing 45 parts of glycidyl methacrylate, 10 parts of i-butyl methacrylate, 30 parts of methyl methacrylate and 15 parts of styrene as monomers, and 8.0 parts of tert-butylperoxy-2-ethyl hexanoate as a polymerization initiator was then added dropwise to the vessel over a period of 5 hours.

Following completion of the dropwise addition, the polymerization reaction was continued until the reaction was complete by maintaining the same temperature for a further 10 hours, thereby yielding a solution (A'-1) of an epoxy group-containing vinyl copolymer (A-1). Furthermore, a sample of the epoxy group-containing vinyl copolymer (A-1) was obtained by removing the xylene from 30 parts of the copolymer solution (A'-1) by holding the solution under a reduced pressure of approximately 20 Torr. The properties of the epoxy group-containing vinyl copolymer (A-1) and the solution thereof (A'-1) are shown in Table 1.

Reference Example 2

Preparation of a Comparative Epoxy Group-Containing Vinyl-Based Copolymer (A-2)

With the exception of altering the mixture containing the monomers and the polymerization initiator in the manner shown in Table 1, a solution (A'-2) of a targeted epoxy group-containing vinyl copolymer (A-2) was obtained in the same manner as Reference Example 1. Furthermore, a sample of the epoxy group-containing vinyl copolymer (A-2) was obtained by removing the xylene from the copolymer solution (A'-2) by placing the solution in a vessel, and stirring thoroughly under a reduced pressure of approximately 20 Torr. The properties of the epoxy group-containing vinyl copolymer (A-2) and the solution thereof (A'-2) are shown in Table 1.

TABLE 1

|  |  | Epoxy group-containing vinyl copolymer (A) | |
|---|---|---|---|
|  |  | Reference example 1 A-1 | Reference example 2 A-2 |
| Monomers (parts by weight) | Styrene | 15 | 15 |
|  | Methyl methacrylate | 30 | 30 |
|  | i-butyl methacrylate | 10 |  |
|  | Glycidyl methacrylate | 45 | 45 |
|  | Reactive Silicone "Silaplane FM-0721" |  | 10 |
| Polymerization initiator (parts by weight) | tert-butylperoxy 2-ethylhexanoate | 8.0 | 3.0 |
| Properties of the copolymer (A) | Glass transition temperature (° C.) | 70 | 72 |
|  | Number average molecular weight | 2,000 | 6,000 |
|  | Epoxy equivalence | 340 | 340 |
|  | SP value | 10.31 | 10.18 |
| Properties of the copolymer solution (A') | Non-volatile fraction (weight %) | 51.0 | 51.8 |

Notes:
"Silaplane FM-0721" (a product name, manufactured by Chisso Corporation) is a methacryloyl group-containing organopolysiloxane represented by the aforementioned general formula [I] (wherein, $R^1$ represents a methyl group, $R^2$ represents a trimethylene group, $R^3$ represents an n-butyl group, and m represents 1. The number average molecular weight is approximately 5,000).

[Glass Transition Temperature (° C.)]

The numerical value determined by converting the temperature (K) calculated using the Fox equation shown below to a temperature in ° C.

$$100/Tg = W1/Tg1 + W2/Tg2 + W3/Tg3 + W4/Tg4 \ldots$$

wherein, W1, W2 . . . represent weight fractions (% by weight) of each of the components, and Tg1, Tg2 . . . represent the glass transition temperatures (K) of homopolymers of each of the components. In this description, the glass transition temperature of a homopolymer refers to the value described in Polymer Handbook, Second Edition, edited by J.

Brandrup and E. H. Immergut. In the case of a copolymer that contains organosiloxane side chains, the glass transition temperature was calculated without including the organosiloxane component in the above equation, using only the remaining components.

[Number Average Molecular Weight]

The number average molecular weight determined by measuring the molecular weight of the tetrahydrofuran-soluble fraction using gel permeation chromatography.

[SP Value]

The value determined using the method described in detail in the above description.

Reference Example 3

Preparation of an Epoxy Group-Containing Vinyl-Based Copolymer (B-1)

A reaction vessel fitted with a thermometer, a stirrer, a reflux condenser, and a nitrogen inlet was charged with 100 parts of xylene, and the temperature was raised to 120° C.

A mixture containing the monomers and polymerization initiator shown in Table 2(1) was then added dropwise to the vessel over a period of 4 hours. Following completion of the dropwise addition, the polymerization reaction was continued until the reaction was complete by maintaining the same temperature for a further 10 hours, thereby yielding a solution (B'-1) of an epoxy group-containing vinyl copolymer (B-1).

Furthermore, a sample of the epoxy group-containing vinyl copolymer (B-1) was obtained by removing the xylene from 30 parts of the copolymer solution (B'-1) by holding the solution under a reduced pressure of approximately 20 Torr. The properties of the epoxy group-containing vinyl copolymer (B-1) and the solution thereof (B'-1) are shown in Table 2(2).

Reference Examples 4 and 5

Preparation of Epoxy Group-Containing Vinyl-Based Copolymers (B-2) and (B-3)

With the exception of altering the mixture containing the monomers and the polymerization initiator in the manner shown in Table 2(1), solutions (B'-2) and (B'-3) of targeted epoxy group-containing vinyl copolymers (B-2) and (B-3) were obtained in the same manner as Reference Example 3. Furthermore, samples of the epoxy group-containing vinyl copolymers (B-2) and (B-3) were obtained by removing the xylene from separate samples containing 30 parts of the copolymer solutions (B'-2) and (B'-3) respectively, by holding the solutions under a reduced pressure of approximately 20 Torr. The properties of the epoxy group-containing vinyl copolymers (B-2) and (B-3) and the solutions thereof (B'-2) and (B'-3) are shown in Table 2(2).

Reference Example 6

Preparation of a Comparative Epoxy Group-Containing Vinyl-Based Copolymer (B-4)

With the exception of altering the mixture containing the monomers and the polymerization initiator in the manner shown in Table 2(1), a solution (B'-4) of a comparative epoxy group-containing vinyl copolymer (B-4) was obtained in the same manner as Reference Example 3. Furthermore, a sample of the epoxy group-containing vinyl copolymer (B-4) was obtained by removing the xylene from 30 parts of the copolymer solution (B'-4) by holding the solution under a reduced pressure of approximately 20 Torr. The properties of the epoxy group-containing vinyl copolymer (B-4) and the solution thereof (B'-4) are shown in Table 2(2).

TABLE 2(1)

| | | Epoxy group-containing vinyl copolymer (B) | | | |
|---|---|---|---|---|---|
| | | Reference example 3 B-1 | Reference example 4 B-2 | Reference example 5 B-3 | Reference example 6 B-4 |
| Monomers (parts by weight) | n-butyl methacrylate | 20 | 20 | 15 | 30 |
| | 2-ethylhexyl acrylate | 20 | | | |
| | Glycidyl methacrylate | 30 | 30 | 30 | 30 |
| Reactive silicone (parts by weight) | "Silaplane TM-0701T" | 10 | | 10 | |
| | "Silaplane FM-0721" | | 10 | | |
| alkyl methacrylate (b-1) containing an alkyl group of 8 or more carbon atoms | 2-ethylhexyl methacrylate | | | 15 | |
| | "Acryester SL" | 20 | 40 | | 40 |
| | Stearyl methacrylate | | | 30 | |
| Polymerization initiator (parts by weight) | tert-butylperoxy 2-ethylhexanoate | 0.5 | 0.7 | 0.5 | 0.5 |

Notes:
"Silaplane TM-0701T" (a product name, manufactured by Chisso Corporation) is 3-methacryloxypropyltris(trimethylsiloxy)silane, with a molecular weight of 423.
"Acryester SL" (a product name, manufactured by Mitsubishi Rayon Co., Ltd.) is a mixture of an alkyl methacrylate that contains an alkyl group of 12 carbon atoms as a side chain, and an alkyl methacrylate that contains an alkyl group of 13 carbon atoms as a side chain.

TABLE 2(2)

| | | Epoxy group-containing vinyl copolymer (B) | | | |
|---|---|---|---|---|---|
| | | Reference example 3 B-1 | Reference example 4 B-2 | Reference example 5 B-3 | Reference example 6 B-4 |
| Properties of copolymer (B) | Glass transition temperature (° C.) | −23 | −20 | −34 | −16 |
| | Number average molecular weight | 7,200 | 8,000 | 6,700 | 7,000 |
| | Epoxy equivalence | 480 | 475 | 480 | 480 |

TABLE 2(2)-continued

|  |  | Epoxy group-containing vinyl copolymer (B) | | | |
|---|---|---|---|---|---|
|  |  | Reference example 3 B-1 | Reference example 4 B-2 | Reference example 5 B-3 | Reference example 6 B-4 |
|  | Proportion of alkyl methacrylate (b-1) containing an alkyl group of 8 or more carbon atoms (weight %) | 20 | 40 | 45 | 40 |
|  | SP value | 8.85 | 8.78 | 8.65 | 8.91 |
| Properties of copolymer solution (B') | Non-volatile fraction (weight %) | 50.3 | 49.9 | 50.2 | 50.0 |

Reference Examples 7 to 9

Preparations of Mixtures (S) of an Epoxy Group-Containing Vinyl Copolymer (A) and an Epoxy Group-Containing Vinyl Copolymer (B)

Using the blend ratios shown in Table 3, the solution (A'-1) of the epoxy group-containing vinyl copolymer (A-1) obtained in Reference Example 1, and each of the solutions (B'-1) to (B'-3) of the epoxy group-containing vinyl copolymers (B) obtained in Reference Examples 3 to 5 were combined in a vessel, and the resulting mixtures were then stirred under a reduced pressure of approximately 20 Torr to remove the xylene, thereby yielding mixtures (S-1) to (S-3) respectively with a non-volatile fraction of at least 99.5% by weight.

Reference Example 10

Preparation of a Mixture (S-4) of an Epoxy Group-Containing Vinyl Copolymer (A) and a Comparative Epoxy Group-Containing Vinyl Copolymer (B-4)

Using the blend ratios shown in Table 3, and using the solution (A'-1) of the epoxy group-containing vinyl copolymer (A-1) obtained in Reference Example 1 and the solution (B'-4) of the epoxy group-containing vinyl copolymer obtained in Reference Example 6, preparation in the same manner as Reference Example 7 yielded a mixture (S-4) with a non-volatile fraction of 99.7% by weight.

Reference Example 11

Preparation of a Mixture (S-5) of an Epoxy Group-Containing Vinyl Copolymer (A), a Comparative Epoxy Group-Containing Vinyl Copolymer (B-4), and an Organopolysiloxane Using the blend ratios shown in Table 3, and using the solution (A'-1) of the epoxy group-containing vinyl copolymer (A-1) obtained in Reference Example 1, the solution (B'-4) of the epoxy group-containing vinyl copolymer obtained in Reference Example 6, and an organopolysiloxane "SILAPLANE FM-0721" (a product name, manufactured by Chisso Corporation), preparation in the same manner as the reference example 7 yielded a mixture (S-5) with a non-volatile fraction of 99.6% by weight.

TABLE 3

|  |  | Mixture (S) of epoxy group-containing vinyl copolymer (A) and epoxy group-containing vinyl copolymer (B) | | | | |
|---|---|---|---|---|---|---|
|  |  | Reference Example 7 S-1 | Reference Example 8 S-2 | Reference Example 9 S-3 | Reference Example 10 S-4 | Reference Example 11 S-5 |
| Epoxy group-containing vinyl copolymer solution (A'-1) (parts by weight) | | 98 | 98 | 98 | 98 | 98 |
| Epoxy group-containing vinyl copolymer solution (B') (parts by weight) | B'-1 | 2 | | | | |
|  | B'-2 | | 2 | | | |
|  | B'-3 | | | 2 | | |
|  | B'-4 | | | | 2 | 2 |
| "SILAPLANE FM-0721" (parts by weight) | | | | | | 0.2 |
| Organopolysiloxane side chain content within combined weight of copolymers (A) and (B) (% by weight) | | 0.2 | 0.2 | 0.2 | 0 | 0 |
| Blend ratio between copolymer (A) and copolymer (B) (B)/(A) (weight ratio) | | 2/98 | 2/98 | 2/98 | 2/98 | 2/98 |
| Difference in SP values between copolymer (A) and copolymer (B) (A) − (B) | | 1.46 | 1.53 | 1.66 | 1.40 | 1.40 |

Reference Examples 12 to 14

Preparation of Powder Coating Compositions According to the Present Invention Using the blend ratios shown in Table 4(1), the various components were mixed together in a "HENSCHEL MIXER" (a mixing device, manufactured by Mitsui Miike Machinery Co., Ltd.), and the resulting mixture was then kneaded with heating using a "MP-2015" (a biaxial extrusion kneader, manufactured by APV Chemical Machinery Inc., USA).

The thus obtained mixtures were then cooled, ground, and classified, thereby yielding a series of targeted powder coating compositions (X-1) to (X-3) with average particle sizes of 15 to 35 micrometers (μm).

Comparative Reference Example 1

With the exceptions of using the epoxy group-containing vinyl copolymer (A-1) obtained in Reference Example 1 instead of the mixture (S-1) obtained in the reference example 7, and using the blend ratio shown in Table 4(2), a comparative powder coating composition (X-4) was prepared in the same manner as Reference Example 12.

Comparative Reference Example 2

With the exceptions of using the mixture (S-4) obtained in Reference Example 10 instead of the mixture (S-1) obtained in Reference Example 7, and using the blend ratio shown in Table 4(2), a comparative powder coating composition (X-5) was prepared in the same manner as Reference Example 12.

Comparative Reference Example 3

With the exceptions of using the epoxy group-containing vinyl copolymer (A-2) obtained in Reference Example 2 instead of the mixture (S-1) obtained in Reference Example 7, and using the blend ratio shown in Table 4(2), a comparative powder coating composition (X-6) was prepared in the same manner as Reference Example 12.

Comparative Reference Example 4

With the exceptions of using the mixture (S-5) obtained in Reference Example 11 instead of the mixture (S-1) obtained in Reference Example 7, and using the blend ratio shown in Table 4(2), a comparative powder coating composition (X-7) was prepared in the same manner as Reference Example 12.

TABLE 4(1)

| | | Reference Example 12 | Reference Example 13 | Reference Example 14 |
|---|---|---|---|---|
| Powder coating composition | | X-1 | X-2 | X-3 |
| Mixture (S) of epoxy group-containing vinyl copolymer (A) and epoxy group-containing vinyl copolymer (B) (parts by weight) | S-1 | 100 | | |
| | S-2 | | 100 | |
| | S-3 | | | 100 |
| Curing agent (C) (parts by weight) | Dodecanoic diacid | 33 | 33 | 33 |
| Additive (parts by weight) | Benzoin | 0.5 | 0.5 | 0.5 |
| | TROY 570FL | 1.0 | 1.0 | 1.0 |

TABLE 4(2)

| | | Comparative Reference Example 1 | Comparative Reference Example 2 | Comparative Reference Example 3 | Comparative Reference Example 4 |
|---|---|---|---|---|---|
| Powder coating composition | | X-4 | X-5 | X-6 | X-7 |
| Epoxy group-containing vinyl copolymer (parts by weight) | A-1 | 100 | | | |
| | S-4 | | 100 | | |
| | A-2 | | | 100 | |
| | S-5 | | | | 100 |
| Curing agent (C) (parts by weight) | Dodecanoic diacid | 33 | 33 | 33 | 33 |
| Additive (parts by weight) | Benzoin | 0.5 | 0.5 | 0.5 | 0.5 |
| | TROY 570FL | 1.0 | 1.0 | 1.0 | 1.0 |

Note:
Troy 570L is the product name for a leveling agent manufactured by Troy Chemical Corporation.

Reference Example 15

Preparation of Acrylic Resin Aqueous Solution

A mixed solution of 250 parts of styrene, 157 parts of methyl methacrylate, 63 parts of 2-hydroxyethyl methacrylate, 30 parts of methacrylic acid, and 8 parts of tert-butyl peroxyoctoate (hereafter abbreviated as TBPO) was prepared in advance.

Subsequently, a reaction vessel fitted with a thermometer, a stirrer, a reflux condenser, and a nitrogen inlet was charged with 75 parts of this mixed solution and 500 parts of methyl ethyl ketone (MEK), and after stirring the solution for 30 minutes at 75° C. under a nitrogen-sealed atmosphere, the remainder of the mixed solution was added dropwise to the flask over a period of 2 hours.

The reaction was then continued at the same temperature for a period of 12 hours, yielding an acrylic resin solution with a non-volatile fraction of 50% by weight, a solution acid value of 20, a solution hydroxyl value of 25, and a Gardner viscosity at 25° C. (this also applies to subsequent examples) of Z.

Subsequently, 31 parts of dimethylaminoethanol was added to 1,000 parts of the acrylic resin solution, 600 parts of water was added, and the solvent was removed, yielding an acrylic resin aqueous solution (E-1) with a non-volatile fraction of 55% by weight.

Reference Example 16

Preparation of Acrylic Resin Aqueous Solution

With the exception of altering the acrylic monomer components to those monomers listed below, preparation in the same manner as Reference Example 15 yielded a stable, milky white acrylic resin aqueous dispersion (E-2) with a non-volatile fraction of 45% by weight, containing a water-dispersible acrylic resin in the form of fine cross-linked particles that are insoluble in the solvent.
[Acrylic Monomer Components Used]

| | |
|---|---|
| Methyl methacrylate | 450 parts |
| Ethyl acrylate | 350 parts |
| 2-hydroxyethyl methacrylate | 150 parts |
| Acrylic acid | 20 parts |
| Ethylene glycol dimethacrylate | 30 parts |
| n-octylmercaptan | 5 parts |
| Ammonium persulfate | 4 parts |
| "TRITON X-200" | 15 parts |
| "EMULGEN 840s" | 10 parts |
| Deionized water | 530 parts |

Notes:
"TRITON X-200" is a product name for an anionic surfactant, manufactured by Rohm & Haas Company, USA.
"EMULGEN 840s" is a product name for a nonionic surfactant, manufactured by Kao Atlas Co., Ltd.

Notes: "TRITON X-200" is a product name for an anionic surfactant, manufactured by Rohm & Haas Company, USA.
"EMULGEN 840s" is a product name for a nonionic surfactant, manufactured by Kao Atlas Co., Ltd.

Reference Example 17

Preparation of Thickener

To 64 parts of "ACRYSOL ASE-60" (a product name of a thickener manufactured by Rohm & Haas Company, solid fraction=28%) were added 6 parts of dimethylethanolamine and deionized water, thus yielding a targeted thickener with a solid fraction of 3%. Hereafter this product is referred to as the thickener (P).

Reference Example 18

Preparation of Water-Based Base Coat Coating Material (1)

100 parts of the acrylic resin aqueous solution (E-1) obtained in the reference example 15, 10 parts of the thickener (P) obtained in Reference Example 17, 6 parts of "CYMEL 300" (a brand name for hexamethoxymethylated melamine, manufactured by Mitsui Cytec Ltd.), 1.0 parts of p-toluenesulfonic acid, 3 parts of "ALUMINUM PASTE DISPERSION #4919" (a trade name of an aluminum paste, manufactured by Toyo Aluminum K.K.), 1.5 parts of "ALUMINUM PASTE #55-519" (also manufactured by Toyo Aluminum K.K.), and 12 parts of isopropanol were mixed together, and the viscosity at 20° C., as measured with a No. 4 Ford cup, was adjusted to a value of 16 seconds using deionized water. Hereafter, this product is referred to as the water-based base coat coating material [i-1].

Reference Example 19

Preparation of Water-Based Base Coat Coating Material (2)

100 parts of the acrylic resin aqueous solution (E-2) obtained in the reference example 16, 10 parts of the thickener (P) obtained in Reference Example 17, 5 parts of "CYMEL 300", 1.0 parts of p-toluenesulfonic acid, 3 parts of "ALUMINUM PASTE DISPERSION #4919", 1.5 parts of "ALUMINUM PASTE DISPERSION #55-519", and 12 parts of isopropanol were mixed together, and the viscosity at 20° C., as measured with a No. 4 Ford cup, was adjusted to a value of 16 seconds using deionized water. Hereafter, this product is referred to as the water-based base coat coating material [i-2].

Examples 1 to 3

The powder coating compositions (X-1) to (X-3) obtained in Reference Examples 12 to 14 were each applied, using an electrostatic spray coating device for powder coatings, to the surface of a satin-finish steel sheet of thickness 0.8 mm that had been subjected to a zinc phosphate treatment, and were subsequently baked at 145° C. for 30 minutes, thereby yielding a series of test sheets with a cured coating film formed thereon. The results of evaluating these coating films are summarized in Table 5.

Comparative Examples 1 to 4

With the exception of using the comparative powder coating compositions (X-4) to (X-7) obtained in Comparative Reference Examples 1 to 4, a series of test sheets with cured coating films formed thereon were prepared in the same manner as Examples 1 to 3. The results of evaluating these coating films are summarized in Table 5. In the comparative example 4, multiple occurrences of cissing meant a uniform coating film could not be obtained, and because accurate measurements of the film thickness and gloss were impossible, the other tests were also not conducted.

TABLE 5

| | Example 1 | Example 2 | Example 3 | Comparative Example 1 | Comparative Example 2 | Comparative Example 3 | Comparative Example 4 |
|---|---|---|---|---|---|---|---|
| Powder coating composition | X-1 | X-2 | X-3 | X-4 | X-5 | X-6 | X-7 |
| Cissing | No | No | No | Yes | No | Yes | Numerous |
| Film thickness (μm) | 40 | 41 | 39 | 41 | 39 | 41 | — |
| Smoothness of coating film | 5 | 5 | 5 | 2 | 4 | 2 | 1 |

TABLE 5-continued

|  | Example 1 | Example 2 | Example 3 | Comparative Example 1 | Comparative Example 2 | Comparative Example 3 | Comparative Example 4 |
|---|---|---|---|---|---|---|---|
| Coating film gloss (60 degree gloss) | 93 | 91 | 92 | 93 | 90 | 89 | — |
| Scratch resistance (%) | 81 | 80 | 83 | 56 | 75 | 64 | — |
| Scratch self-recovery rate (%) | 10 | 8 | 12 | 2 | 1 | 2 | — |
| Water resistance | 4 | 4 | 5 | 3 | 4 | 3 | — |
| Humidity resistance | 4 | 4 | 5 | 3 | 4 | 2 | — |

[Methods of Evaluating Coating Film Properties]
[Cissing] The presence of cissing on the coating film was evaluated visually.
[Film thickness] The film thickness was measured using an electromagnetic film thickness meter.
[Smoothness] The smoothness was judged visually using the following 5-grade evaluation system.
Grade "5": extremely smooth coating film surface
Grade "4": a little roundness is evident
Grade "3": significant roundness is evident
Grade "2": significant roundness is evident, and considerable orange peel surface
Grade "1": significant roundness is evident, and severe orange peel surface, causing significant deterioration in the coating film appearance
[Scratch Resistance]
Each of the powder coating compositions was first applied in the manner described above, and then baked to prepare a test sheet with a cured coating film formed thereon, and once this test sheet had been allowed to stand for 24 hours at 23° C., the 20 degree gloss (20 degree mirror reflectance: %) was measured and recorded as the initial gloss value. Following measurement of this initial gloss value, a piece of felt that had been impregnated with a 10% by weight aqueous cleanser dispersion was rubbed back and forth 50 times across the surface of the test sheet. Following this rubbing, the test sheet washed with water and then allowed to stand for 3 hours at 23° C., the 20 degree gloss (20 degree mirror reflectance: %) was measured, and the ratio with the initial gloss value was used to determine a gloss retention ratio (%), which was then used to evaluate the scratch resistance. A higher gloss retention ratio indicates more favorable scratch resistance.
[Scratch Self-Recovery Property]
In the above scratch resistance test, following measurement of the post-rubbing 20 degree gloss (20 degree mirror reflectance: %), the test sheet was immediately held at a temperature of 60° C. for 1 hour, the 20 degree gloss was once again measured, and the ratio with the initial 20 degree gloss value prior to rubbing was used to determine a gloss retention ratio (%). Based on this gloss retention ratio (%) obtained following storage at 60° C. for 1 hour, and the gloss retention ratio following rubbing but prior to storage at 60° C. for 1 hour, the formula below was used to calculate a scratch self-recovery rate (%), which was used as an evaluation of the scratch self-recovery property. A higher scratch self-recovery rate (%) indicates a more favorable scratch self-recovery property.

(Scratch self-recovery rate)=[(gloss retention rate following storage at 60° C. for 1 hour−gloss retention ratio following rubbing but prior to storage at 60° C. for 1 hour)/(gloss retention ratio following rubbing but prior to storage at 60° C. for 1 hour)]×100(%)

[Water Resistance]
A test sheet was immersed in warm water at 40° C. for a period of 20 days, and 30 minutes after removal of the test sheet the 20 degree gloss (20 degree mirror reflectance: %) was measured, and based on the gloss retention (%), determined from the gloss values before and after the test, the water resistance was judged using the following 5-grade evaluation system.
Grade "5": gloss retention of 90% or higher
Grade "4": gloss retention of at least 80% but less than 90%
Grade "3": gloss retention of at least 65% but less than 80%
Grade "2": gloss retention of at least 50% but less than 65%
Grade "1": gloss retention of less than 50%
[Humidity Resistance]
A test sheet was left to stand for 20 days under conditions including a temperature of 40° C. and a relative humidity of 100%, the 20 degree gloss (20 degree mirror reflectance: %) was measured, and based on the gloss retention (%), determined from the gloss values before and after the test, the humidity resistance was judged using the following 5-grade evaluation system.
Grade "5": gloss retention of 90% or higher
Grade "4": gloss retention of at least 80% but less than 90%
Grade "3": gloss retention of at least 65% but less than 80%
Grade "2": gloss retention of at least 50% but less than 65%
Grade "1": gloss retention of less than 50%

Example 4

Using the powder coating composition (X-1) obtained in Reference Example 12, a coating film was formed using a two-coat one-bake application that was conducted in accordance with the so-called multilayer coating film formation method described below, and the properties of the thus obtained coating film were then evaluated. The base materials subjected to coating had undergone the type of pretreatment described below.
Namely, the base material was prepared by treating a soft steel sheet with "BONDELITE #3030" (a product name of a zinc phosphate-based treating agent, manufactured by Nippon Parkerizing Co., Ltd.), subsequently applying an epoxy resin-based cationic electrodeposition coating material by electrodeposition, and then applying an amino-polyester resin-based intermediate coating material.
First, the water-based metallic coating material [i-1] obtained in Reference Example 18 was applied, in two separate coats and under a coating atmosphere including a temperature of 25° C. and a relative humidity of 65 to 70%, in sufficient quantity to generate a dried film thickness of 20 μm.
A setting period of 2 minutes was allowed between the two coating operations. During the first coating operation, the air pressure of the spray gun was set to 5 Kg/cm² and the flow rate of the coating material was set to 400 m/minute, whereas during the second coating operation, the flow rate of the coating material was set to 200 m/minute, and the distance between the spray gun and the base material undergoing coating was set to 40 cm.

The base material undergoing coating was held in such a manner that the surface of the base material undergoing coating was always vertical.

Following the above two coating operations, the coating film was air dried for 5 minutes at a temperature of 30° C. Subsequently, the base material was cooled to room temperature, the powder coating composition (X-1) was applied using an electrostatic spray coating device for powder coatings, and the coated sheet was then baked at 145° C. for 30 minutes, thereby yielding a test sheet with a cured coating film formed thereon. The results of evaluating this coating film are shown in Table 6(1).

Examples 5 and 6

With the exceptions of altering the powder coating composition and the water-based metallic coating material in the manner shown in Table 6(1), test sheets with a cured coating film formed thereon were obtained in the same manner as Example 4. The results of evaluating these coating films are shown in Table 6(1).

Comparative Examples 5 to 8

With the exception of using the powder coating compositions (X-4) to (X-7) prepared in Comparative Reference Examples 1 to 4, test sheets with a cured coating film formed thereon were obtained in the same manner as Example 4. The results of evaluating these coating films are shown in Table 6(2). In the case of the comparative example 8, multiple occurrences of cissing meant a uniform coating film could not be obtained, and because accurate measurements of the film thickness and gloss were impossible, the other tests were also not conducted.

TABLE 6(1)

| | Example 4 | Example 5 | Example 6 |
|---|---|---|---|
| Powder coating composition | X-1 | X-2 | X-3 |
| Name of water-based base coat coating material | [i-1] | [i-2] | [i-1] |
| Cissing | No | No | No |
| Top coat film thickness (μm) | 40 | 42 | 41 |
| Smoothness of coating film | 5 | 5 | 5 |
| Coating film gloss (60 degree gloss) | 89 | 88 | 90 |
| Scratch resistance (%) | 81 | 78 | 83 |
| Scratch self-recovery rate (%) | 11 | 8 | 11 |
| Water resistance | 4 | 4 | 5 |
| Humidity resistance | 3 | 4 | 5 |

TABLE 6(2)

| | Comparative Example 5 | Comparative Example 6 | Comparative Example 7 | Comparative Example 8 |
|---|---|---|---|---|
| Powder coating composition | X-4 | X-5 | X-6 | X-7 |
| Name of water-based base coat coating material | [i-2] | [i-1] | [i-2] | [i-1] |
| Cissing | Yes | No | Yes | Numerous |
| Top coat film thickness (μm) | 42 | 40 | 41 | — |
| Smoothness of coating film | 2 | 4 | 2 | — |
| Coating film gloss (60 degree gloss) | 91 | 88 | 87 | — |
| Scratch resistance (%) | 54 | 75 | 66 | — |
| Scratch self-recovery rate (%) | 2 | 1 | 0 | — |
| Water resistance | 3 | 4 | 3 | — |
| Humidity resistance | 3 | 4 | 2 | — |

INDUSTRIAL APPLICABILITY

A powder coating composition of the present invention enables the formation of a coating film with excellent external appearance and scratch resistance, and is consequently extremely useful as an environmentally friendly automobile coating material, and particularly as a top coat coating material, meaning the industrial significance of this coating composition is enormous.

The invention claimed is:

1. A powder coating composition comprising, as essential components, an epoxy group-containing vinyl copolymer (A) with a glass transition temperature of 40° C. or higher, an epoxy group-containing vinyl copolymer (B) that contains organosiloxane side chains and has a glass transition temperature of 0° C. or lower, and a polyvalent carboxylic acid (C), wherein said organosiloxane side chains within said epoxy group-containing vinyl copolymer (B) are side chains obtained using an organosiloxane represented by a general formula [I] shown below:

[Formula 1]

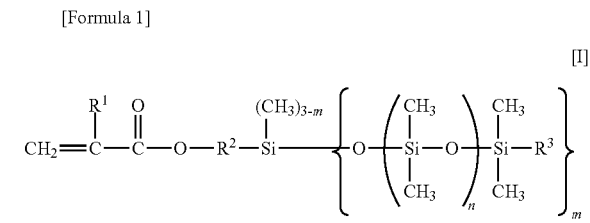

wherein, $R^1$ represents a hydrogen atom or a methyl group, $R^2$ represents a bivalent hydrocarbon group of 1 to 12 carbon atoms, or a bivalent hydrocarbon group that contains an ether linkage and/or ester linkage, $R^3$ represents a monovalent hydrocarbon group of 1 to 8 carbon atoms, m represents an integer from 1 to 3, and n represents an integer from 0 to 250; and wherein said epoxy group-containing vinyl copolymer (B) has a lower SP value than that of said epoxy group-containing vinyl copolymer (A), and a difference in SP values between said epoxy group-containing vinyl copolymer (A) and said epoxy group-containing vinyl copolymer (B) is within a range from 1.0 to 4.0; and wherein a quantity of said organosiloxane side chains within said epoxy group-containing vinyl copolymer (B) is within a range from 0.01 to 5% by weight relative to the combined weight of said epoxy group-containing vinyl copolymer (A) and said epoxy group-containing vinyl copolymer (B).

2. A powder coating composition according to claim 1, wherein said epoxy group-containing vinyl copolymer (B) comprises from 30 to 80% by weight of structural units derived from an alkyl methacrylate (b-1) containing an alkyl group of 8 or more carbon atoms.

3. A powder coating composition according to claim 2, wherein a quantity of said organosiloxane side chains within said epoxy group-containing vinyl copolymer (B) is within a range from 0.05 to 2% by weight relative to a combined weight of said epoxy group-containing vinyl copolymer (A) and said epoxy group-containing vinyl copolymer (B).

4. A powder coating composition according to claim 1, wherein a quantity of said organosiloxane side chains within said epoxy group-containing vinyl copolymer (B) is within a range from 0.05 to 2% by weight relative to a combined weight of said epoxy group-containing vinyl copolymer (A) and said epoxy group-containing vinyl copolymer (B).

5. A powder coating composition according to claim 1, wherein the epoxy equivalence within this epoxy group-containing vinyl copolymer (A) is within a range from 200 to 800.

6. A powder coating composition according to claim 1, wherein the epoxy equivalence within this epoxy group-containing vinyl copolymer (A) is within a range from 250 to 450.

7. A powder coating composition according to claim 1, wherein the epoxy equivalence within this epoxy group-containing vinyl copolymer (A) is within a range from 300 to 400.

8. A powder coating composition according to claim 1, wherein the quantity of the epoxy group-containing vinyl copolymer (B) is 0.1 to 10% by weight relative to the amount of the epoxy group-containing vinyl copolymer (A).

9. A powder coating composition according to claim 1, wherein the quantity of the epoxy group-containing vinyl copolymer (B) is 0.5 to 5% by weight relative to the amount of the epoxy group-containing vinyl copolymer (A).

10. The powder coating composition according to claim 2, wherein said alkyl methacrylate (b-1) is 2-ethylhexyl methacrylate, n-octyl methacrylate, isooctyl methacrylate, 2-ethyloctyl methacrylate, n-decyl methacrylate, isodecyl methacrylate, lauryl methacrylate, stearyl methacrylate, eicosyl methacrylate, tetracicosyl methacrylate or a combination of two or more thereof.

11. The powder coating composition according to claim 2, wherein said alkyl methacrylate (b-1) contains an alkyl group of 12 or more carbon atoms as a raw material.

12. The powder coating composition according to claim 11, wherein said alkyl methacrylate (b-1) is lauryl methacrylate or stearyl methacrylate.

* * * * *